United States Patent [19]

Springer

[11] Patent Number: 4,766,445
[45] Date of Patent: Aug. 23, 1988

[54] ELECTRODE ARRAY FOR A PRINT HEAD

[75] Inventor: Johann Springer, Aichwald, Fed. Rep. of Germany

[73] Assignee: Alcatel N.V., Amsterdam, Netherlands

[21] Appl. No.: 53,140

[22] Filed: May 21, 1987

[30] Foreign Application Priority Data

May 22, 1986 [DE] Fed. Rep. of Germany ....... 3617249

[51] Int. Cl.⁴ .......................... G01D 9/42; G02F 1/07
[52] U.S. Cl. ..................................... 346/108; 350/356
[58] Field of Search ................. 346/108, 107 R, 76 L, 346/160, 76 PH; 358/296; 350/353, 355, 356

[56] References Cited

U.S. PATENT DOCUMENTS 4,636,817  1/1987  Masaki ................................ 346/108
4,658,271  4/1987  Wessel ............................. 346/107 R Primary Examiner—H. Broome
Assistant Examiner—Mark Reinhart
Attorney, Agent, or Firm—Christie, Parker & Hale

[57] ABSTRACT

An electrode array is disclosed for a print head of an electrooptical facsimile recording device for recording spots line by line. The recording spots are exposed on a recording medium through light gates (35). These light gates (35) are arranged in rows and are defined by high field strength edge portions (switching areas) of spot electrodes (22, 22') and main electrodes (23, 24, 25, 26). Each spot electrode (22, 22') is associated with n light gates (35, 19), each spot-electrode row (27, 28) being associated with n main electrodes, so that n(N−n) light gates are formed by N electrodes. The electrode array in designed so that each spot-electrode row (27, 28) is between at least wo elongated main electrodes; each spot electrode 22 has n switching areas (20, 21) which are located adjacent n respective main electrodes.

5 Claims, 6 Drawing Sheets

ELECTRODE ARRAY FOR A PRINT HEAD

TECHNICAL FIELD

The present invention relates to an electrode array for a print head of an electrooptical facsimile recording device.

BACKGROUND ART

An electrode array for a print head of a facsimile recording device for recording a line of spots is disclosed in published German patent application DE-OS No. 34 40 406. A print head of this kind is intended for use as part of an optical printer where it is located between a light source and a recording medium. The recording medium is exposed one line at a time through the print head.

DISCLOSURE OF INVENTION

It is one object of the invention to provide an improved electrode array for a linear array print head for a facsimile machine or the like which permits shorter printing times. It is another object to provide an improved electrode array for a print head which does not require any insulating layer between the electrodes in simple electrode arrays.

In accordance with one aspect of the present invention, there is provided on the surface of the electrooptical substrate of the print head electrode array a row of spot electrodes, with adjacent portions of a first elongated main electrode on a first side thereof defining a first row of light-gate areas, and a second main elongated electrode on the other side of the row of spot electrodes similarly defining a second row of light-gate areas. Thus no insulating layer is required for a simple array of two rows of light-gate areas located between two main electrodes. Furthermore, undesirable "crosstalk" is eliminated and switch times are reduced.

In accordance with another aspect of the present invention, in order to expose a single recorded line there are provided a total of N/M rows (6, 6') of said spot electrodes and at least N-1 of said elongated electrodes where N is an integer greater than 2, and M is the number of outputs of a 1-of-M demultiplexer used for energizing purposes.

In accordance with yet another aspect of the present invention, there are provided N rows of light-gates (7, 8) each having a height d, with the distance between the light-gate rows (15, 16, 17, 18) to be energized directly one after the other is $d(m \pm 1/M)$, where m is an integer greater than or equal to 0.

In accordance with still another aspect of the present invention, the light gates are rectangular and are arranged so that their sides and the line connecting the light-gate row include an angle of 45°.

BEST MODE FOR CARRYING OUT THE INVENTION

Figure 1:
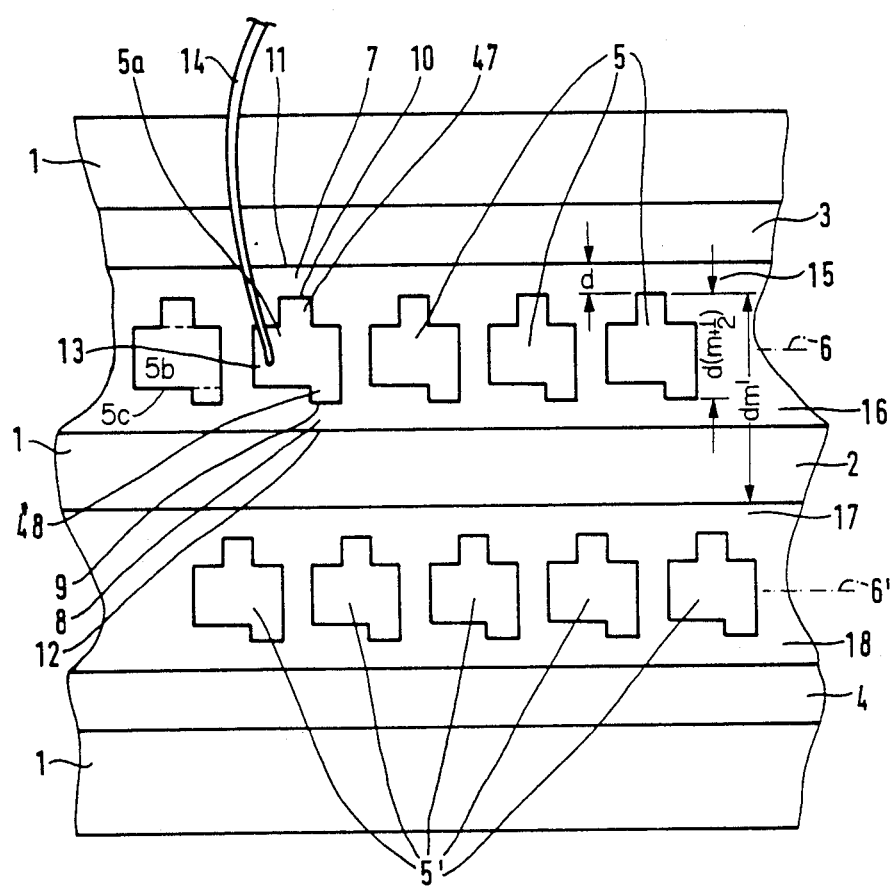
FIG. 1 is a top view of a first embodiment of the electrode array in accordance with the invention.

FIG. 1 shows part of a first embodiment of an electrode array in accordance with the invention. The electrode array is of a periodic design which may be repeated for the remainder of the array (not shown). The electrodes are disposed on the one side of a PLZT substrate 1. To the other side of the substrate, an aperture plate is attached which has window-like openings in those areas where light is to pass (not shown). The PLZT substrate 1 is a known electrooptically active ceramic consisting of lead, lanthanum, zirconate and titanate. The electrode array consists of three elongated main electrodes 2, 3, 4 and of a plurality of individual spot electrodes 5, 5'. The spot electrodes 5, 5' are arranged in two spot-electrode rows 6, 6'. The main electrodes 2, 3, 4 and the spot-electrode rows 6, 6' are parallel to each other, two main electrodes 2, 3; 2, 4 being located on opposite sides of each spot-electrode row 6, 6'.

The specific design details of the spot electrodes 5, 5' will now be described using the spot electrode 5a as an example. The spot electrode 5a has two border areas 9, 10 from which a homogeneous electric field emerges with a higher field strength than from the other areas of the spot electrode. In the following, also in the description of the other embodiments, these higher field strength border areas will be referred to as switching areas. The spot electrode 5a consists of a central rectangle 5b and of two projecting portions 47, 48 located on two opposite sides of the rectangle. Those sides of the projecting portions 47, 48 which are parallel to the long sides 5c of the rectangle form the switching areas 9, 10. An area 12 of the main electrode 2 acts as a counterelectrode to the switching area 9 of the spot electrode 5a and will be referred to as switching area 12. Between the switching area 9 and the switching area 12, an electric field is applied which causes the electrooptical effect; this area is referred to as light gate 8. Correspondingly, a light gate 7 is present between the switching area 10 and a switching area 11. Furthermore, the spot electrodes have an area 13 for a bonding wire 14 to be attached. When attaching the latter, care should be taken that it will not be located above the light gate 7. In FIG. 1, the bonding wire 14 is shown only at the spot electrode 5a, but it should be understood that similar bonding wires are provided to the other spot electrodes 5, 5'. The location of the two switching areas 9, 10 is so chosen that two directly adjacent recording spots on one recorded line are exposed through the corresponding light gates 7 and 8.

The electrode array of FIG. 1 is energized by a 1-of-2 demultiplexer using time-division multiplexing. More particularly, in a first time interval, main electrode 2 is energized and in a second time interval, main electrodes 3 and 4 are jointly energized. Since the recording medium is then moving in a direction perpendicular to the linear electrode array, the light-gate rows 15 and 16 and the light-gate rows 17 and 18 are separated by distances of $d(m + \frac{1}{2})$, where d is the distance between two opposite switching areas forming the height of one light-gate row, and m an integer greater than or equal to 0. The distances between the light-gate rows 15 and 17 and between the light-gate rows 16 and 18 are dm', where m' is a positive integer. To reproduce a complete recorded line, not only the light-gate rows 15 and 16 formed by the spot electrodes 5 and the main electrodes 2 and 3, but also the light-gate rows 17 and 18 formed by the spot electrodes 5' of the spot-electrode row 6' and the main electrodes 2 and 4 are needed. The recording spots of a recorded line are exposed through four light-gate rows, recording spots adjacent on the recorded line being exposed through successive light-gate rows.

Figure 2:
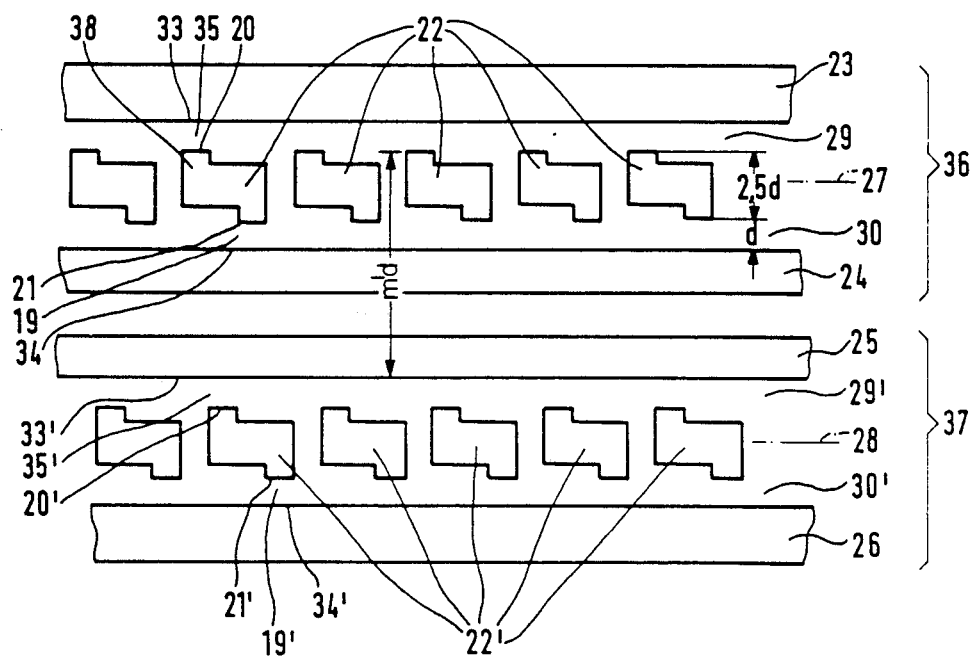
FIG. 2 is a top view of a second embodiment of the electrode array in accordance with the invention.

The second embodiment, shown in FIG. 2, differs from the first embodiment in two aspects. First of all, instead of the single central electrode 2 of FIG. 1, there are two adjacent central electrodes 24, 25, and secondly, the two switching areas 20, 21 of the spot electrodes 22 are arranged differently. The electrode array of the second embodiment has four strip-shaped main electrodes 23, 24, 25 and 26, and two spot-electrode rows 27 and 28. This results in two sections 36, 37 which can be energized separately and which each have two light-gate rows 29, 30 and 29', 30'. The first row of light gates 35 formed by the upper switching areas 20 of the upper row of spot electrodes 22 and the switching areas 33 of the top main electrode 23 result in the first upper light-gate row 29. The second row of light gates 19 formed by the lower switching areas 21 of the spot electrodes 22 and the switching areas 34 of the upper central main electrode 24 result in the second upper light-gate row 30. Similarly, the third row of light gates 35' formed by the upper switching areas 20' of the lower row of spot electrodes 22' and the switching areas 33' of the lower central main electrode 25 result in the first lower light-gate row 29' and the fourth row of light gates 19' formed by the lower switching areas 21' of spot electrodes 22' and the switching areas 34' of the bottom main electrode 26 result in the second lower light-gate row 30'. This electrode array is energized with a 1-of-2 demultiplexer using time-division multiplexing. In other words, in alternating fashion, either the upper section 36 the light-gate row 29 is energized via the main electrode 23 or else the light-gate row 30 is energized via the main electrode 24 in turn. The same is true in analogous fashion for the lower section 37. Compared to the first embodiment, this embodiment has the advantage of permitting simpler data conditioning. Since the recording medium is moving during the switching period, the light-gate rows 29 and 30 and the light-gate rows 29' and 30' are separated by distances of $d(m+\frac{1}{2})$, where d is the height of one light gate and m an integer. The switching period and the feed rate of the recording medium are so chosen that the recording medium is moved on by the distance $\frac{1}{2}$ in one switching operation. The distances between the light-gate rows 29 and 29' and the light-gate rows 20 and 30' are m'd where m' is a positive integer.

The switching areas 20, 21 of the spot electrodes 22, 22' are arranged so that two recording spots which are exposed through two light gates associated with a common spot electrode 22 are printed on the recorded line separated by a third recording spot. This permits the bonding pad 38 on each of the spot electrodes 22, 22' to be formed at the center of the electrode area.

Figure 3:
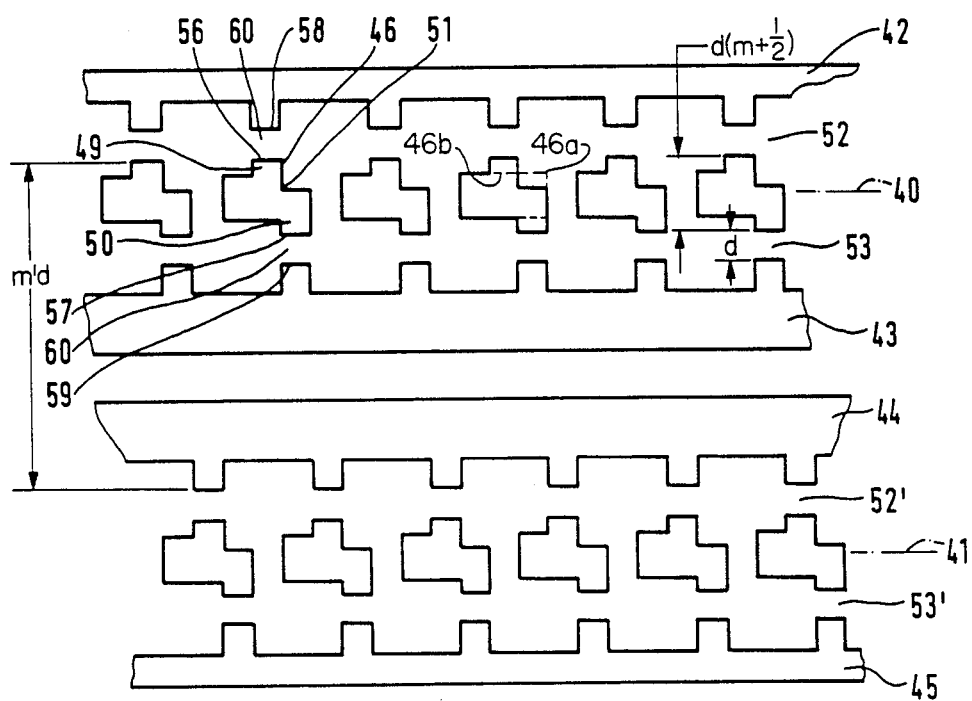
FIG. 3 is a top view of a third embodiment of the electrode array in accordance with the invention.

The electrode array of FIG. 3 is the third embodiment and is also suitable for energization with a 1-of-2 demultiplexer using time-division multiplexing. It has also two spot-electrode rows 40, 41 and four main electrodes 42, 43, 44, 45. The spot electrodes 46 have a structure similar to that of the first embodiment. Each spot electrode 46 also consists of a rectangle 46a and of two projecting portions 49, 50 located on two opposite sides of the rectangle, the latter having a recess 51 at one corner. Those sides of the projecting portions 49, 50 which are parallel to the long sides 46b of the rectangle form the switching areas 56, 57. On their sides facing the spot electrodes 46, each of the four main electrodes 42, 43, 44, 55 has projecting portions with the switching areas 58, 59 each located so as to be opposite a switching area 56, 57 of the spot electrodes. The areas between the switching areas 56, 58 and between the switching areas 57, 59 form the light gates 60 and, thus, the light-gate rows 52, 53, 52', 53'. Furthermore, the size of the spot electrodes 46 is so chosen that the distances between the light-gate rows 52 and 53 and the light-gate rows 52' and 53' equal $d(m+\frac{1}{2})$ and the distances between the light-gate rows 52 and 52' and the light-gate rows 53 and 53' are m'd, where m and m' are positive integers and d is the distance between two opposite switching areas. The assignment of the light gates to the recording spots on one recorded line corresponds to that of the first embodiment.

Figure 4:
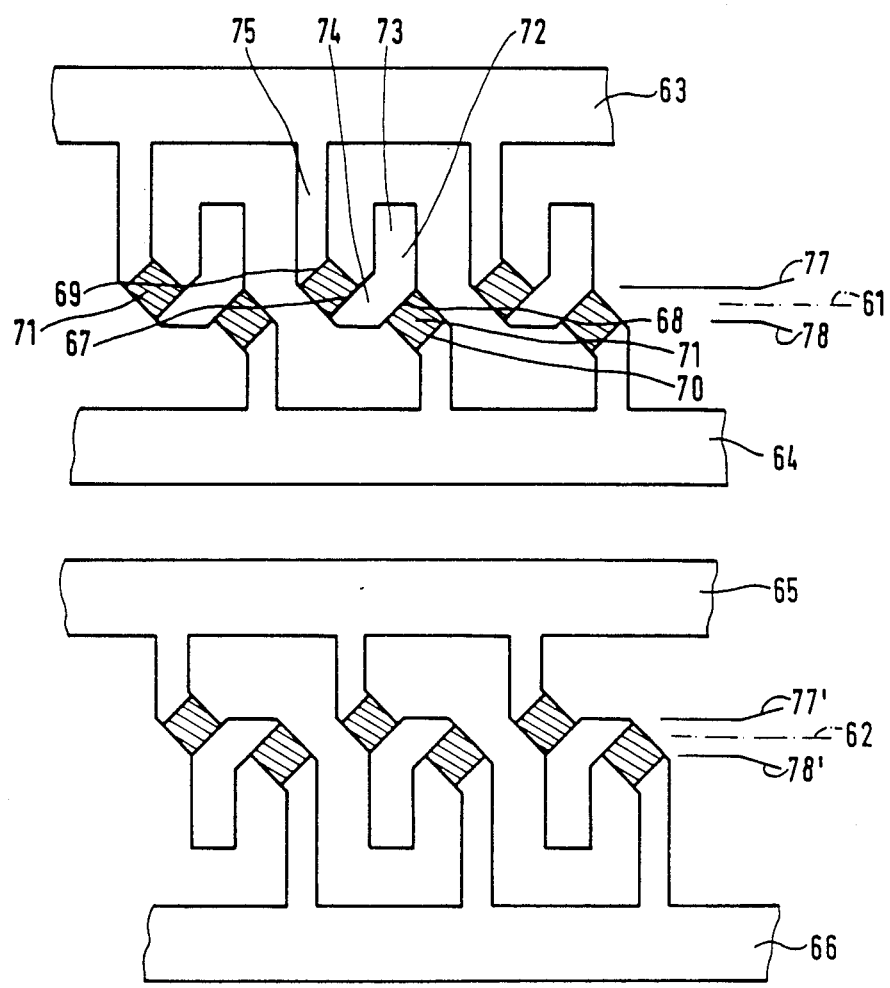
FIG. 4 is a top view of a fourth embodiment of the electrode array in accordance with the invention.

The electrode array of FIG. 4 is the fourth embodiment and, as the two preceding embodiments, is suitable for energization using time-division multiplexing. It also has two spot-electrode rows 61, 62 and four main electrodes 63, 64, 65, 66. The light gates 71 are also defined by two opposite switching areas 67, 69 and 68, 70 and are designed as light-gate rows 77, 78, 77', 78'. The light gates 71 are hatched in FIG. 4. The main electrodes 63, 64, 65, 66 are strip-shaped and have narrow, elongate projecting portions 75. Those sides of the projecting portions parallel to the strip-shaped main electrodes are oriented at an angle of 45° in relation to the longitudinal axis of the strip. The ends of the angled portions form the switching areas 69, 70 of the main electrodes 63, 64, 65, 66. The projecting portions of the main electrodes 63 and 66 are longer than those of the main electrodes 64 and 65. Each spot electrode 72 is interposed between the main electrodes 63, 64 and 65, 66 as spot-electrode rows 61 and 62. Each of them is formed by a two-leg area, the two legs 73, 74 including an angle of 135°. The one leg 73 is parallel to the projecting portions 75 and interposed between two narrow projecting portions 75 of a main electrode. The other leg 74 is parallel to the sides of the narrow projecting portions 75 forming the switching areas 69, 70 and interposed between two of these sides of projecting portions 75 of adjacent continuous electrodes. The sides of the leg 74 opposite the switching areas 69, 70 form the switching areas 67, 68 of the spot electrode 72. The distance between two opposite switching areas 67, 69 and 68, 70 is equal to the length of the switching areas 69, 70. The light gates 71 thus are square, with the sides of the light gates making an angle of 45° with the longitudinal axis of each of the light-gate rows 77, 78 77', 78'. Thus, if a recording medium is exposed, the recording spots are also rotated by 45°. Compared to the electrode arrays of the preceding embodiments, this electrode array permits a different dot pattern on the recording medium with which, for example, diagonals can be reproduced more clearly. Furthermore, the narrow projecting portions 75 reduce the cross-coupling behavior between the spot electrodes 72.

Figure 5:
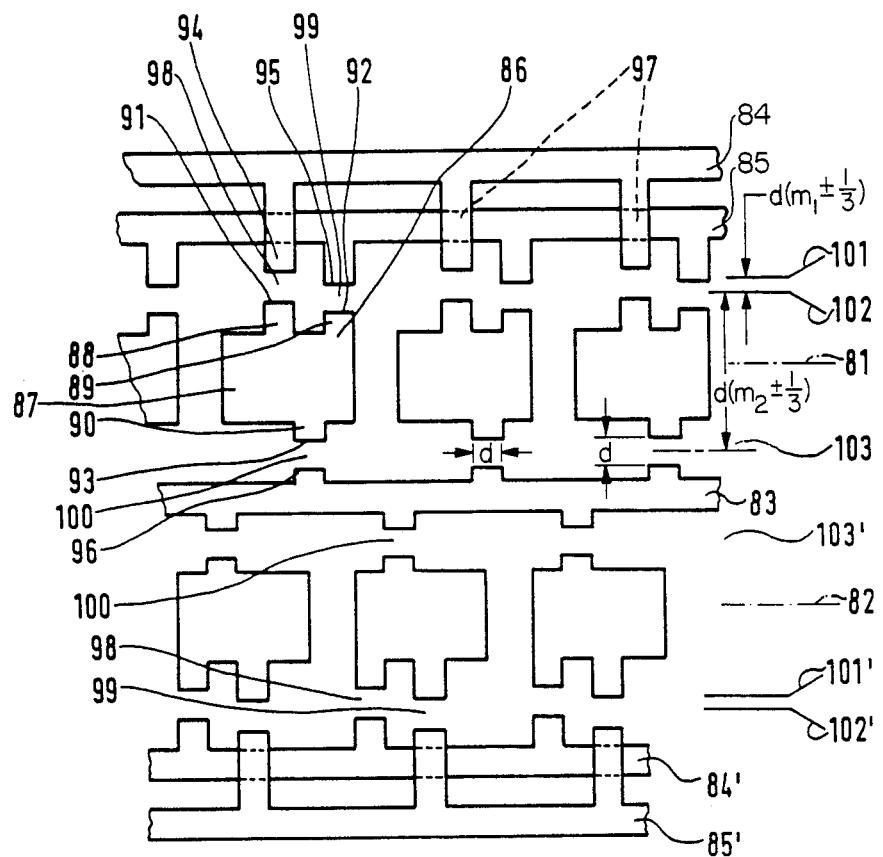
FIG. 5 is a top view of a fifth embodiment of the electrode array in accordance with the invention.

The electrode array of FIG. 5 is the fifth embodiment and is particularly suitable for energization with a 1-of-3 demultiplexer using time-division multiplexing. To this end, the electrode array has two spot-electrode rows 81, 82 and five main electrodes 83, 84, 84', 85, 85'. Each spot electrode consists of a rectangle 87 and of three projecting portions 88, 89, 90 whose end faces form the switching areas 91, 92, 93. The five main electrodes 83, 84, 84', 85, 85' are parallel to the spot-electrode rows and also have projecting portions with switching areas 94, 95, 96. The main electrode 83 is located between the two spot-electrode rows 81, 82, and the main electrodes 84, 85 and 84', 85' are arranged in pairs at the outer long sides of the spot-electrode rows 81, 82. The projecting areas of the main electrode 84 intersect the main electrode 85, and the projecting areas of the main electrode 85' intersect the main electrode 84'. The main electrodes at these intersections 97 are separated by an insulating layer (not shown). The switching areas 91, 92, 93 of the spot electrodes 86 and the switching areas 94, 95, 96 of the main electrodes 83, 84, 84', 85, 85' all have the same width d. The spot electrodes and the main electrodes are associated with each other so that the switching areas 91, 94; the switching areas 92, 95, and the switching areas 93, 96 are located opposite each other at the distance d. The areas between the switching areas form the light gates 98, 99, 100. To this end, the switching areas 91, 92 are located on the same side of each spot electrode 86, and the switching areas 93 are located on the opposite side of the switching areas 91, 92 of each spot electrode 86. The recording spots exposed through the associated light gates are each reproduced side by side on the recorded line, the recording spot exposed through the light gate 100 being located between the two others. The light gates are square, their sides have the length d. The light gates 98 form the light-gate rows 101 and 101', the light gates 99 form the light-gate rows 102 and 102', the light gates 100 form the light-gates rows 103 and 103'. The electrode array is designed so that it can be energized using time-division multiplexing. To switch the light gates, each of the corresponding spot electrodes is energized and the main electrodes 83, 84, 84' and 85, 85' are energized one after the other. The main electrodes 84, 85, 85' are energized in pairs.

To compensate for the advance of the recording medium during the switching period between the main electrodes, the light-gate rows 101, 101' are staggered in relation to the light-gate rows 102, 102' by the distance $d(m_1 \pm \frac{1}{3})$ and the latter are staggered in relation to the light-gate rows 103, 103' by the distance $d(m_2 \pm \frac{1}{3})$ in the direction of movement of the recording medium. Since each spot electrode contributes to form three light gates, and since only one bond is needed for each spot electrode, this electrode array permits a high resolution, since the resolution typically is limited by the closeness of the bonds. Therefore, this electrode array is suitable also for reproducing a three-color print.

Figure 6:
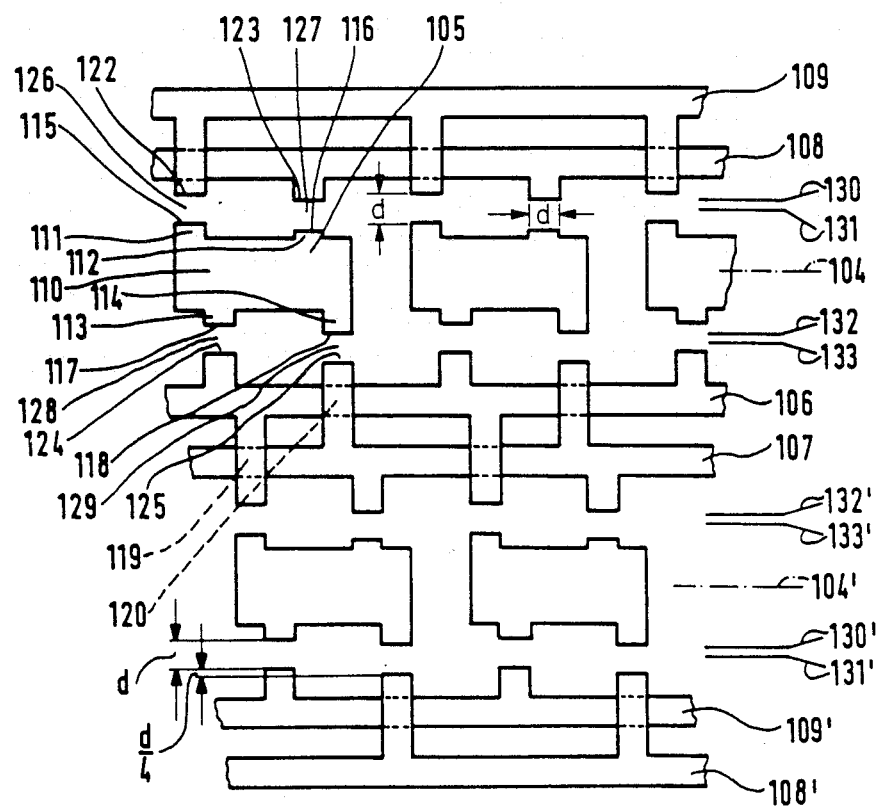
FIG. 6 is a top view of a sixth embodiment of the electrode array in accordance with the invention.

The electrode array of FIG. 6 is the sixth embodiment and is particularly suitable for energization with a 1-of-4 demultiplexer using time-division multiplexing. To this end, the electrode array has two-spot electrode rows 104, 104' and six main electrodes 106, 107, 108, 108', 109 and 109'. Each spot electrode 105 consists of a rectangle 110 and of four projecting portions 111, 112, 113, 114 whose end faces form the switching areas 115, 116, 117, 118. The spot electrodes and the six main electrodes, which also have projecting portions, are arranged similarly to the electrodes of the fifth embodiment. The difference is that instead of the main electrode 83 (FIG. 5), there are two main electrodes 106 and 107 (FIG. 6). The projecting portions 119 of the main electrode 106 intersect the main electrode 107, and the projecting portions 120 of the main electrode 107 intersect the main electrode 106. At these intersections, the electrodes are separated by an insulating layer (not shown). The end faces of the projecting portions of the main electrodes 106, 107, 108, 108', 109, 109' form the switching areas 122, 123, 124, 125 of the main electrodes 109, 108, 106, and 107, respectively. The switching areas 115, 116, 117, 118 of the spot electrodes 105 and the switching areas 122, 123, 124, 125 all have the same width d. The spot electrodes and the main electrodes are associated with each other so that the switching areas 115, 122; the switching areas 116, 123; the switching areas 117, 124, and the switching areas 118, 125 are located opposite each other at distances d. To this end, two switching areas 115, 116 and 117, 118 each are located on one side of each spot electrode, but in pairs on opposite sides. The areas between opposite switching areas form the light gates 126, 127, 128, 129 which are square. Their sides have the length d. The light gates 126 form the light-gate rows 130 and 130', the light gates 127 form the light gate rows 131 and 131', the light gates 128 form the light-gate rows 132 and 132', and the light gates 129 form the light-gate rows 133 and 133'. To switch the light gates, the main electrodes 106, 107, 108, 108', 109 and 109' are sequentially energized, with the main electrodes 108, 108' and 109, 109' being energized in pairs. To compensate for the advance of the recording medium during the switching operation between the main electrodes, the light-gate rows are staggered in relation to each other by the distances $d(m_i \pm \frac{1}{3})$ in the direction of movement of the recording medium. By increasing the number of the light gates which are energized via a bonding wire, an extremely high resolution of 32 recording spots per mm can be achieved.

Alternatively, the electrode array of the sixth embodiment may be modified for energization with a 1-of-3 demultiplexer using time-division multiplexing. To this end, the main electrodes 109 and 109' and the corresponding projecting portions 111 with the switching areas 115 are omitted and the other projecting portions with their switching areas are arranged so that a complete recorded line can again be exposed. The advantage of this electrode array as compared to that of the fifth embodiment is that the intersecting areas 119, 120 are limited to two main electrodes.

The present invention has been described above with regard to the structure, function and use of a several presently contemplated specific embodiments of the invention. It should be appreciated by those skilled in the art that many modifications and variations are possible. Accordingly the exclusive rights afforded hereby should be broadly construed, limited only by the spirit and scope of the appended claims.

What is claimed is:

1. In the print head of an electrooptical facsimile recording device, the combination comprising:
   an electrooptical substrate;
   a first row of at least three spot electrodes disposed on a first surface of said substrate, said row of at least three spot electrodes defining a first spot-electrode row axis;
   a first elongated electrode defining a first longitudinal axis and being disposed on said first surface of said substrate on a first side of said first spot-electrode row axis, said first elongated electrode being parallel to and spaced apart from said row of spot electrodes whereby adjacent portions of said first elongated electrode and of said spot electrodes define therebetween a first row of light-gate areas, and a second elongated electrode defining a second longitudinal axis and being disposed on said first surface of said substrate on a second side of said first spot-electrode row axis, said second elongated electrode being parallel to and spaced apart from said row of spot electrodes and separated from said first elongated electrode by said first row of spot electrodes, whereby adjacent portions of said second elongated electrode and of said spot electrodes define therebetween a second row of light-gate areas.

2. The combination of claim 1, wherein each spot electrode is in the shape of a rectangle having at least one projecting area on each of two opposite sides of said rectangle adjacent a respective one of said first and second elongated electrodes and separated therefrom by a respective one of said light gate areas.

3. The combination of claim 1, wherein in order to expose a single recorded line there is provided a total of N rows of said light gate areas and a total of N/M rows of said spot electrodes where M is the number of outputs of a 1-of-M demultiplexer used for energizing purposes.

4. The combination of claim 3 wherein the light gate areas have a height d and the distance between two light-gate rows to be energized directly one after the other by said demultiplexer is $d(m \pm 1/m)$, where m is an integer greater than or equal to 0.

5. The combination of claim 1 wherein the light gate areas are rectangular and are arranged so that an angle of 45° is included between an adjacent portion of the spot electrode defining a particular light gate area and a line connecting the a row of said light-gate areas.

* * * * *